United States Patent [19]

Binder et al.

[11] 4,100,440
[45] Jul. 11, 1978

[54] ALTERNATOR-RECTIFIER-REGULATOR UNIT OR MUSHROOM SHAPE FOR VEHICULAR SERVICE

[75] Inventors: Georg Binder, Stuttgart; Rolf Lindauer, Illingen; Rudiger Sohnle, Stuttgart, all of Germany; Harald Wahler, Laval, France

[73] Assignee: Robert Bosch GmbH, Stuttgart, Germany

[21] Appl. No.: 717,766

[22] Filed: Aug. 25, 1976

Related U.S. Application Data

[63] Continuation of Ser. No. 580,080, May 22, 1975, abandoned.

[30] Foreign Application Priority Data

May 22, 1974 [DE] Fed. Rep. of Germany ....... 2424788

[51] Int. Cl.² .............................................. H02K 5/00
[52] U.S. Cl. ...................................... 310/89; 310/42; 310/68 D
[58] Field of Search ............... 310/68, 68 D, 157, 263, 310/89, 232, 58, 139, 42, 171, 166, 71; 318/138, 254

[56] References Cited

U.S. PATENT DOCUMENTS

| | | | |
|---|---|---|---|
| 3,184,625 | 5/1965 | Farison | 310/263 |
| 3,253,167 | 5/1966 | Bates | 310/263 |
| 3,271,606 | 9/1966 | Collins | 310/263 |
| 3,422,339 | 1/1969 | Baker | 310/68 D |
| 3,602,747 | 8/1971 | Stroppa | 310/263 |
| 3,628,328 | 12/1971 | Matsuzawa | 310/263 |

FOREIGN PATENT DOCUMENTS

| | | | |
|---|---|---|---|
| 1,125,767 | 12/1965 | United Kingdom | 310/68 |
| 976,458 | 11/1964 | United Kingdom | 310/263 |
| 1,116,459 | 6/1968 | United Kingdom | 310/263 |

*Primary Examiner*—R. Skudy
*Attorney, Agent, or Firm*—Flynn & Frishauf

[57] ABSTRACT

The combination of the brush holder of the alternator and the voltage regulator into a unitary structure mounted on a cover fitting over a hole in the alternator casing enables the complete assembly to be economically made in the mushroom shape conventional for d.c. generators of vehicle engines, so that the device can readily be incorporated into an engine of existing design.

4 Claims, 1 Drawing Figure

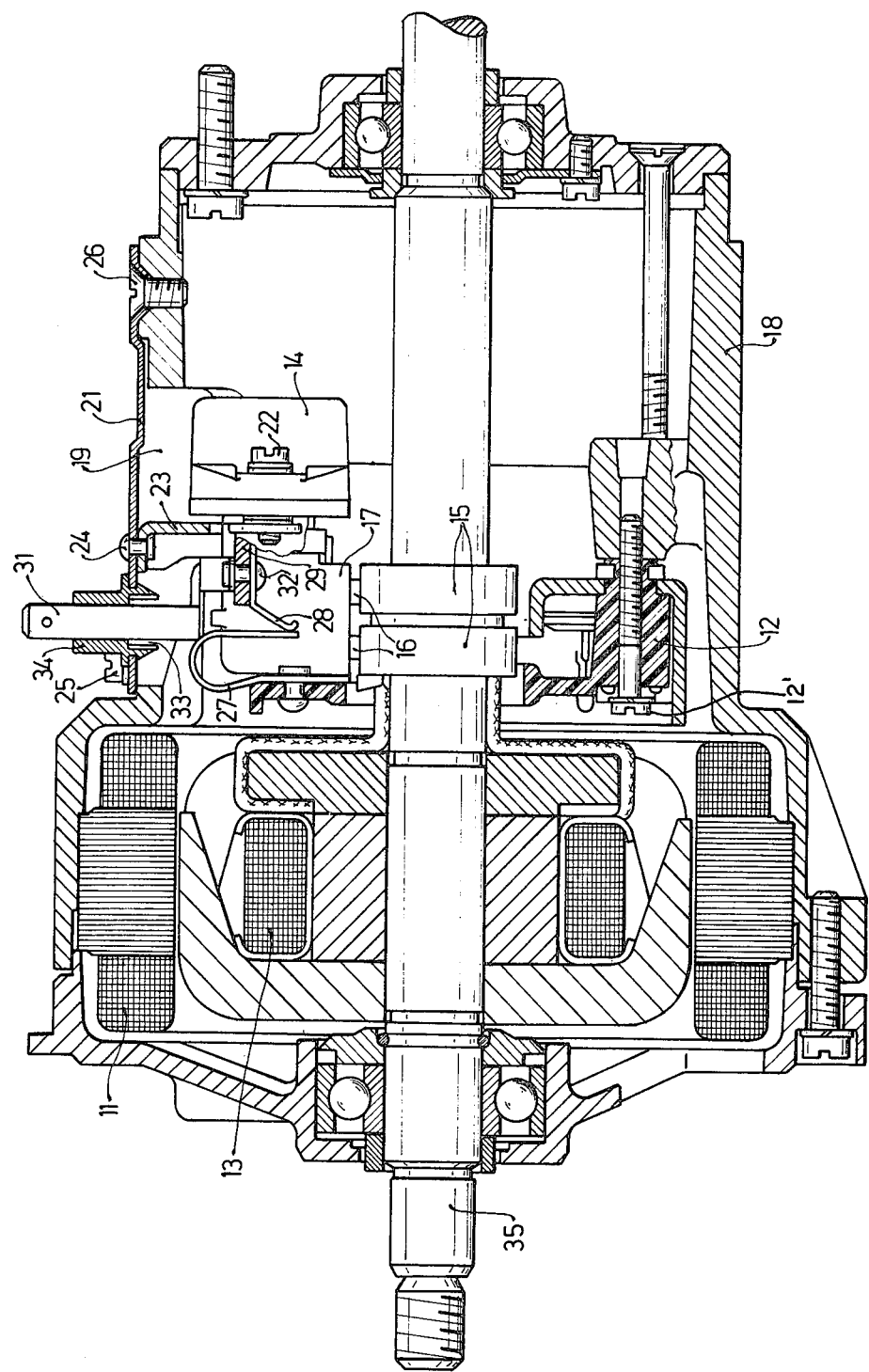

ALTERNATOR-RECTIFIER-REGULATOR UNIT OR MUSHROOM SHAPE FOR VEHICULAR SERVICE

This is a continuation, of application Ser. No. 580,080, filed May 22, 1975 now abandoned.

This invention concerns a mechanically powered electric current unit suitable for motor vehicle service of the kind including a multiphase a.c. generator, generally a 3-phase generator with a rectifier and a voltage regulator built into the generator casing. The generator in such a unit will typically have a stator with a 3-phase winding, a rotor with an excitation winding and slip rings and brushes for connecting the rotor excitation winding to the stationary part of the device, the brushes being held in a brush holder. And more particularly the invention concerns such an electric current supply unit having a mushroom-shaped casing.

Mushroom-shaped generators are already known, but heretofore these have been exclusively conventional direct current generators for motor vehicles. For reasons of historical origin the mushroom shape, that is, the form with an elongated stem, is determined by the current-generating system of the device. Modern motor vehicle design, however, now favors, practically exclusively, generators of the 3-phase a.c. type. 3-phase generators, however, have heretofore characteristically shown a substantially shorter construction shape, that is, a shorter axial dimension for the same girth.

Machine tools for the manufacture of motor vehicles that are made in great number cannot for economic reasons be replaced by new machine tools merely on account of the change of shape of a single accessory unit. Until now, however, a 3-phase generator with the outer shape of an automobile d.c. generator was not available.

It is accordingly an object of the present invention to provide a current supply unit incorporating a multiphase alternator having a form factor suited for assembly into a motor vehicle power plant built with machine tools of the kinds now widely available, and in particular to provide such a current supply unit in the mushroom shape now familiar for units using straight-forward d.c. generation.

SUBJECT MATTER OF THE PRESENT INVENTION

Briefly, in a mushroom-shaped casing containing the alternator, rectifier and voltage regulator, the brush holder of the alternator and the voltage regulator are combined into a unitary physical structure located in the stem portion of the casing, the casing is provided with a lateral aperture of a size, shape and location suitable for insertion and removal of this unitary structure, a cover is provided for fully covering the aperture when the cover is affixed to the housing and the unitary structure combining the brush holder and the voltage regulator is fastened to this cover. The stator and rotor of the alternator are located in the wider head portion of the casing.

The resulting mushroom-shaped alternator-rectifier unit, in which by definition of "mushroom shape" there is an elongated cylindrical stem portion and a head portion of shorter axial length and larger diameter than the stem portion, has the advantage that its outer dimensions are compatible with engines designed for conventional d.c. generators and the further advantage that the voltage regulator is incorporated in the casing of the alternator-rectifier unit. There is the still further advantage that the provision of the voltage regulator and the brush holder in a single physical unit that can be installed through an opening in the casing which is then fully closed by a cover provides mechanical protection for the voltage regulator. At the same time the cover advantageously serves to provide a mounting for the physical unit constituted of the brush holder and voltage regulator.

A further advantage is obtained if the ungrounded output terminal of the device, usually the positive terminal, is brought out through a plastic insulating brushing seated in a cut-out provided in the cover that supports the voltage regulator and brush holder unit. Finally, a still further advantage can be obtained if the unit consisting of the voltage regulator and the brush holder is mounted directly in the path of the cooling air of the generator.

The invention is further described by way of example with reference to the single FIGURE of the annexed drawing, which is a longitudinal cross section of an illustrative embodiment of the invention.

The drawing shows a 3-phase alternator that in the usual way comprises a 3-phase winding 11 on the stator, a rectifier assembly 12, an exciter winding 13 provided in the rotor, which in the illustrated case is a claw-pole rotor, a voltage regulator 14 in the neighborhood of the slip rings 15 that are connected to the exciter winding 13 and, finally, brushes 16 held in a brush holder 17. The rectifier assembly 12 is fastened directly to an internal boss of the casing 18 by means of a screw 12'. The entire current supply system is situated in a casing 18 which has a cylindrical stem portion and a head portion of larger diameter that encloses the stator and rotor.

The voltage regulator assembly 14 and the brush holder 17 are combined into a unitary physical structure constituting a unitary component of the alternator-rectifier-regulator unit. A lateral opening 19 is provided in the stem portion of the casing 18 through which this component unit containing the voltage regulator 14 and the brush holder 17 can be inserted. The opening 19 can be closed with a cover 21. The combined component unit 14, 17 is fastened by screws to a bracket 23 which is in turn riveted to the cover 21. The cover 21 is screwed onto the casing 18 by means of screws 25, 26. A first compression spring 27 leads from the rectifier unit 12 towards the positive connection D+ (29) of the voltage regulator 14, making electrical contact for this purpose with a second leaf spring 28 mounted on the rivet 32 which fastens the connection lug 31 to the ungrounded terminal 29 that is commonly designated the D+ terminal of the alternator-rectifier unit. The connection lug 31 protrudes through a cut-out 33 in the cover 21 and is insulated from the latter by a plastic bushing 34. A fan, not shown in the drawing, is mounted on the generator shaft 35 on the side of the generator windings on which the current processing system (rectifier and regulator) is located. This fan sucks air into the interior of the casing 18 and causes it to pass down its length. The voltage regulator 14 is located directly in the cooling air stream.

In assembly of the alternator-rectifier unit, the unitary structure formed of the voltage regulator 14 and the brush holder 17 is first secured to the cover 21 and then the cover 21 is mounted on the casing 18. This assembly procedure completes the connecting up of the generator, because all the electrical connections of the generator are provided in the casing 18 without any other manual intervention therein by the insertion of the component group consisting of the voltage regulator 14, the brush holder 17, the cover 21 and the connection lug 31 into its place in the casing.

The drawing also shows the mushroom shape of the casing 18. The stem portion, which begins above the enlarged head portion that houses the stator 11 and the rotor 13 of the alternator, is longer than its diameter and the diameter of the head portion just mentioned is greater than that of the stem portion. The fastening screws 25 and 26 for the cover are screwed into the stem portion of the casing 18, which as shown in the drawing begins just below the screw 25 and extends upwards therefrom.

Although the invention has been described with reference to an illustrative embodiment, it will be understood that variations are possible within the inventive concept.

We claim:

1. Mechanically powered electric current supply unit suitable for vehicular service comprising a multiphase alternator having a stator provided with a multiphase winding, a rotor provided with an excitation winding, slip rings connected to the excitation winding, and a brush holder provided with brushes therein making contact respectively with said slip rings, rectifying means connected to said multiphase winding and voltage regulating means connected to said rectifying means for regulation of the d.c. output voltage of said unit, and incorporating the improvement consisting, in combination, in that:

said alternator, rectifying means and voltage regulating means are contained in a mushroom-shaped casing (18) having an elongated and substantially cylindrical stem portion and a head portion of shorter axial length and larger diameter than said stem portion;

said brush holder (17) of said alternator and said voltage regulating means (14) are combined into a unitary physical structure forming a component of said unit and located in said stem portion of said casing;

said rectifying means (12) are mounted in said stem portion of said casing (18);

the stem portion of said casing (18) is provided with a lateral aperture (19) of a size, shape and location suitable for insertion and removal of said unitary physical structure (14, 17) containing said brush holder and said voltage regulating means;

a cover (21) is provided fully covering said aperture (19) and removably affixed to said casing (18), and said unitary physical structure (14, 17) containing said brush holder and said voltage regulating means is fastened to said cover (21), while said rectifying (12) means are fastened directly to said casing (18) independently of the fastening of said cover (21) to said casing (18), whereby said unitary structure and said cover together are removable from said casing independently of said rectifying means.

2. Electric current supply unit as defined in claim 1, in which a cut-out (33) is provided in said cover (21) and the connection lug (31) of the d.c. output terminal of said unit which is ungrounded with respect to said casing is arranged to pass through said cut-out and, further, a synthetic resin brushing (34) is provided in said cut-out surrounding said connection lug so as to insulate the connection lug from said cover.

3. Electric current supply unit as defined in claim 2, in which said ungrounded d.c. terminal of said unit is the electro-positive terminal thereof.

4. Electric current supply unit as defined in claim 1, in which said unitary physical structure (14, 17) containing said brush holder and said voltage regulating means is located, when it and said cover are affixed in place in said unit, directly in the path of the cooling air of said alternator.

* * * * *